March 17, 1942.   D. G. EHRICH   2,276,945
ADJUSTABLE HOLDING DEVICE
Filed May 20, 1940
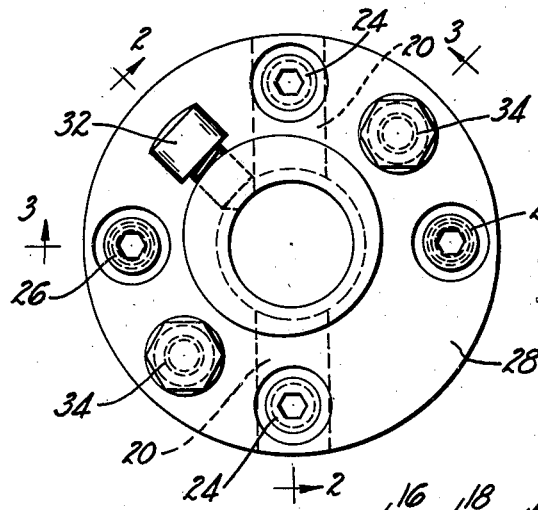
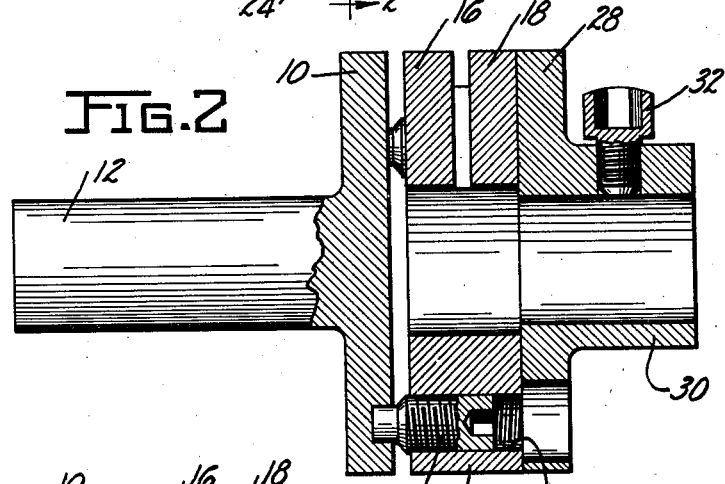
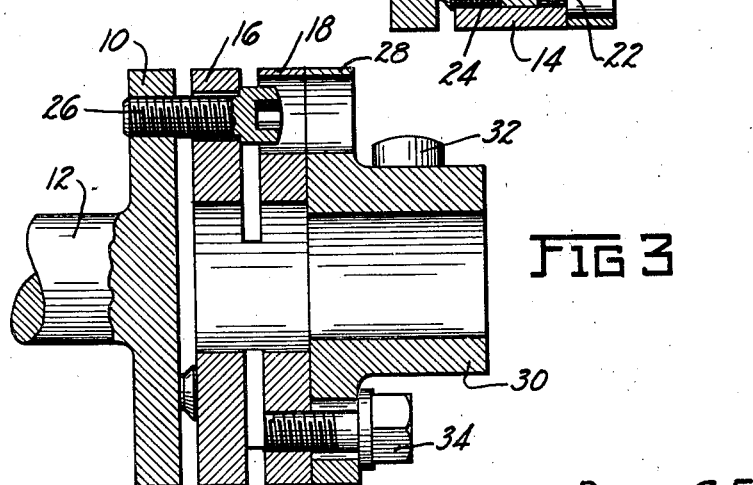
INVENTOR
DONN G. EHRICH
BY
McConkey and Booth
ATTORNEYS.

Patented Mar. 17, 1942

2,276,945

UNITED STATES PATENT OFFICE 2,276,945

ADJUSTABLE HOLDING DEVICE

Donn G. Ehrich, South Bend, Ind.

Application May 20, 1940, Serial No. 336,100

7 Claims. (Cl. 279—5)

This invention relates to adjustable holding devices and more particularly to devices for adjustably holding a tool or work piece in a desired angular and axial position during a machining operation.

In many machining operations such as drilling or reaming or in grinding or refinishing drills or reamers, it is necessary that the tool or work piece, as the case may be, is accurately alined and centered. The usual self-centering chuck is frequently too inaccurate for these operations and chucks of other types which can be adjusted to center the work accurately are slow and tedious to set.

It is accordingly one of the objects of the present invention to provide an adjustable holding device for a tool or work piece which can be adjusted quickly and easily to provide accurate alinement and centering.

Another object of the invention is to provide an adjustable holding device in which alining and centering adjustments can be performed separately.

Still another object of the invention is to provide an adjustable holding device which is simple and inexpensive in construction and which performs its functions efficiently and accurately.

The above and other objects, advantages and novel features of the invention will be apparent from the following description read in connection with the accompanying drawing, in which:

Figure 1 is an end elevation of an adjustable holding device embodying the invention; and Figures 2 and 3 are sections on the lines 2—2 and 3—3 respectively of Figure 1.

The illustrated device comprises a first plate 10 which may be any desired supporting plate or which may be formed with a shaft extension 12 for attachment to any standard chuck or the like. A second annular compound plate 14 is secured adjacent the plate 10 and includes two plate parts 16 and 18 connected to be angularly adjustable relative to each other.

According to the present invention the plate parts 16 and 18 are connected by radially extending integral portions 20 which are relatively narrow in width and a bore 22 extends through each of the portions 20 as seen in Figure 2 and is threaded to receive machine screws 24 forming adjustable projections between the plate part 16 and the first plate 10. The screws 24 are formed with end portions fitting into sockets in the plate 10 to provide a driving connection between the plates.

At diametrically opposite points spaced 90° from the screws 24 a pair of screws 26 pass loosely through holes in the plate part 16 and are threaded into the plate 10. By adjusting the screws 24 and 26 it will be seen that any desired angular relationship between the plates 10 and 14 can be obtained.

The screws 24 and 26 necessarily strain the plate part 16 and tend to warp it. However, due to the fact that the portions 20 are so arranged with relation to the plate parts 16 and 18 and the center opening therein that little if any strain is transmitted to the plate part 18 it stays flat. This is an important feature contributing both to ease of adjustment and to accuracy.

The tool or work piece is held by a clamp including a plate 28 having formed thereon a hub 30 to receive the tool shank. A set screw 32 is shown to secure the shank in place, but it will be apparent that any other type of fastening means could be employed. The plate 28 is secured to the plate part 18 by screws 34 passing through enlarged holes in the plate 28 and threaded into the part 18. By loosening screws 34 the plate 28 may be shifted and secured to the part 18 in any desired position.

In use, a tool or work piece is secured in the hub 30 and the shaft 12 is fastened in a chuck or the like. The screws 24 and 26 are then adjusted to aline the tool and are securely tightened. At this time the surface of part 18 is exactly normal to the desired alinement and the plate 28 may be adjusted thereon to shift the tool axis to the desired center line.

While one embodiment of the invention has been shown and described in detail it will be understood that this is for the purpose of illustration only and is not intended as a definition of the scope of the invention, reference being had for this purpose to the appended claims.

What is claimed is:

1. An adjustable holding device comprising a first plate having a substantially plane surface on one side and having on its other side means for connection to a chuck or the like, a compound plate including a plurality of flat plate parts lying parallel and spaced apart axially and connected together by a relatively thin connection of less sectional area than either of the plate parts which will transmit torque between the plate parts without transmitting distortion of one plate part to the other, adjustable means connecting one of the plate parts to the plane surface of the first plate to adjust the angle therebetween, and a third plate shiftably connected to another plate part.

2. An adjustable holding device comprising a first plate having means thereon for connection to a chuck or the like, a second plate including a plurality of plate parts connected by a relatively thin connection whereby distortion of one plate part will not be communicated to the other, adjustable compression and tension elements between the first plate and one of said parts whereby the angle therebetween can be adjusted, and a third plate adjustably secured to another of said parts to be shifted thereon to any one of a plurality of adjusted positions.

3. An adjustable holding device comprising a first plate having means thereon for connection to a chuck or the like, a second plate including a plurality of plate parts connected by a relatively thin connection whereby distortion of one plate part will not be communicated to the other, diametrically opposite adjustable projections between the first plate and one of said plate parts, diametrically opposite tension screws connecting the first plate and said one part at 90° from said projections, and a clamp device secured to another of said plate parts.

4. An adjustable holding device comprising a first plate, a second plate including a pair of plate parts connected by a relatively thin connection whereby distortion of one plate part will not be communicated to the other, diametrically opposite adjustable projections between the first plate and one of said plate parts, diametrically opposite tension screws connecting the first plate and said one part at 90° from said projections, a third plate having clamp means thereon and tension screws connecting the third plate and the other plate part and passing through relatively large openings in one of the plates whereby the third plate can be adjusted laterally on said other plate part.

5. An adjustable holding device comprising a first plate, a second plate including a pair of plate parts connected by a pair of diametrically opposite relatively narrow spacer portions, adjustable projections adjustably spacing the second plate from the first plate, adjustable tension screws connecting the first plate and one of said plate parts at points at 90° from said projections, and a clamp device secured to the other of said plate parts.

6. An adjustable holding device comprising a first plate, a second plate including a pair of plate parts connected by a pair of diametrically opposite relatively narrow spacer portions, adjustable projections adjustably spacing the second plate from the first plate, adjustable tension screws connecting the first plate and one of said plate parts at points at 90° from said projections, a third plate having clamp means thereon, and tension screws passing through relatively large holes in the third plate into the other of said plate parts whereby the third plate can be shifted laterally.

7. An adjustable holding device comprising a first plate having means thereon for connection to a chuck or the like, a second plate including a pair of plate parts connected by a pair of diametrically opposite relatively narrow spacer portions, adjustable projections alined with said spacer portions and adjustably spacing the second plate from the first plate, adjustable tension screws connecting the first plate and one of said plate parts at points at 90° from said projections, a third plate having clamp means thereon, and tension screws passing through relatively large holes in the third plate into the other of said plate parts whereby the third plate can be shifted laterally, and said second and third plates being formed with axial openings therethrough to receive the end of a tool or the like.

DONN G. EHRICH.